US012761873B2

(12) United States Patent
Dibrino

(10) Patent No.: US 12,761,873 B2
(45) Date of Patent: Oct. 13, 2026

(54) METHODS AND APPARATUS FOR QUOTIENT DIGIT RECODING IN A HIGH-PERFORMANCE ARITHMETIC UNIT

(71) Applicant: Huawei Technologies Co., Ltd., Shenzhen (CN)

(72) Inventor: Michael Thomas Dibrino, Austin, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 897 days.

(21) Appl. No.: 18/060,177

(22) Filed: Nov. 30, 2022

(65) Prior Publication Data

US 2023/0086090 A1 Mar. 23, 2023

Related U.S. Application Data

(63) Continuation of application No. PCT/US2020/063955, filed on Dec. 9, 2020.

(60) Provisional application No. 63/032,580, filed on May 30, 2020.

(51) Int. Cl.

| | |
|---|---|
| ***G06F 7/48*** | (2006.01) |
| ***G06F 7/535*** | (2006.01) |
| ***G06F 7/537*** | (2006.01) |

(52) U.S. Cl.

CPC ............ *G06F 7/4824* (2013.01); *G06F 7/535* (2013.01); *G06F 7/5375* (2013.01)

(58) Field of Classification Search

CPC ....... G06F 7/4824; G06F 7/5375; G06F 7/535

See application file for complete search history.

(56) References Cited

U.S. PATENT DOCUMENTS

| | | | | |
|---|---|---|---|---|
| 6,751,645 | B1 * | 6/2004 | Gorshtein | G06F 7/5375 708/650 |
| 10,216,481 | B2 * | 2/2019 | Bruguera | G06F 7/535 |
| 2014/0195581 | A1 * | 7/2014 | Wilkins | G06F 7/535 708/653 |

OTHER PUBLICATIONS

Bruguera, Javier, "Radix-64 Floating-Point Divider," 2018 IEEE 25th Symposium on Computer Arithmetic, Jun. 25, 2018, 8 pages.

Chiang, J., et al., "Carry-Free Radix-2 Substractive Division Algorithm and Implementation of the Divider", Tamkang Journal of Science and Engineering, vol. 3, No. 4, Jan. 2000, 7 Pages.

Chiang, et al., "A Radix-4 New Svobota-Tung Divider with Constant Timing Complexity for Precscaling," The Journal of VLSI Signal Processing, vol. 33, No. 1-2, Jan. 1, 2003, 8 Pages.

* cited by examiner

*Primary Examiner* — Khai M Nguyen

(74) *Attorney, Agent, or Firm* — Slater Matsil, LLP

(57) ABSTRACT

A divider includes a digit recoder that recodes upper bits of a partial remainder into sets of lower-radix multiples without carry propagate addition. Elimination of the carry propagate adder makes computation of the quotient carry free and independent of the number of bits computed per cycle, thereby enabling a higher number of bits per cycle, as well as increased clock speeds.

32 Claims, 8 Drawing Sheets

| MULTIPLE | HIGH (PLUS) | LOW (MINUS) |
|---|---|---|
| 0 | 0 | 0 |
| 1 | 0 | -1 |
| 2 | 0 | -2 |
| 3 | 0 | -3 |
| 4 | 4 | 0 |
| 5 | 4 | -1 |
| 6 | 4 | -2 |
| 7 | 4 | -3 |
| 8 | 8 | 0 |
| 9 | 8 | -1 |
| 10 | 8 | -2 |
| 11 | 8 | -3 |
| 12 | 12 | 0 |
| 13 | 12 | -1 |
| 14 | 12 | -2 |
| 15 | 12 | -3 |

METHODS AND APPARATUS FOR QUOTIENT DIGIT RECODING IN A HIGH-PERFORMANCE ARITHMETIC UNIT

CROSS-REFERENCE TO RELATED APPLICATIONS

This application is a continuation of International Application PCT/US2020/063955, filed Dec. 9, 2020, entitled "Methods and Apparatus for Quotient Digit Recoding in a High-Performance Arithmetic Unit," which claims the benefit of U.S. Provisional Application No. 63/032,580, filed on May 30, 2020, entitled "Quotient Digit Recoding in a High-Performance Divide/Square-Root Unit," applications of which are incorporated herein by reference in their entireties.

TECHNICAL FIELD

The present disclosure relates generally to methods and apparatus for digital computing, and, in particular embodiments, to methods and apparatus for quotient digit recoding or selection in a high-performance arithmetic unit.

BACKGROUND

Division and square-root operations in digital computing are computationally intensive. Such operations can consume considerable resources, such as hardware resources (to implement the algorithm in hardware), time resources (to implement the algorithm in software), or both.

Research continues with the expectation of improving the algorithms implementing these operations, whether to reduce hardware resources required in implementing the algorithms or the time resources required in executing the algorithms.

SUMMARY

According to a first aspect, a redundant binary signed digit (RBSD) divider is provided. The RBSD divider comprising: a first operand prescaling unit configured to scale a divisor by a first scaling factor; a scaled divisor selection unit operatively coupled to the first operand prescaling unit, the scaled divisor selection unit configured to receive an output of the first operand prescaling unit, and selectively swap multiples of plus and minus vectors of inputs to the scaled divisor selection unit to produce selected multiples of the scaled divisor, the swapping being in accordance with a predicted sign of a partial remainder; a digit recoder operatively coupled to multiplexers, the digit recoder configured to recode at least one N-bit portion of the partial remainder as a combination of two N/2-bit vectors; and a plurality of full adder stages having inputs operatively coupled to the scaled divisor selection unit and outputs operatively coupled to the multiplexers, the plurality of full adder stages configured to compress a difference of the partial remainder and the selected multiples of the scaled divisor, wherein the outputs of the plurality of full adder stages being in a redundant format.

In a first implementation form of the RBSD divider according to the first aspect, the first operand scaling unit being further configured to generate one or more additional integer multiples of the scaled divisor.

In a second implementation form of the RBSD divider according to the first aspect or any preceding implementation form of the first aspect, further comprising: a second operand prescaling unit configured to scale a dividend by the first scaling factor, and generate a first multiple of the scaled dividend.

In a third implementation form of the RBSD divider according to the first aspect or any preceding implementation form of the first aspect, the scaled dividend being in one of a non-redundant normal binary format or a RBSD format.

In a fourth implementation form of the RBSD divider according to the first aspect or any preceding implementation form of the first aspect, N being an even integer value.

In a fifth implementation form of the RBSD divider according to the first aspect or any preceding implementation form of the first aspect, N being a combination of a first vector expressible as a ceiling (N/2) and a second vector expressible as a floor (N/2), when N is an odd integer value, where ceiling (N/2) produces a smallest integer greater than N/2 and floor (N/2) produces a largest integer smaller than N/2.

In a sixth implementation form of the RBSD divider according to the first aspect or any preceding implementation form of the first aspect, each full adder stage of the plurality of full adder stages further comprising a partial adder stage.

In a seventh implementation form of the RBSD divider according to the first aspect or any preceding implementation form of the first aspect, further comprising a sign predictor operatively coupled to the plurality of full adder stages, the sign predictor configured to generate the predicted sign of a subsequent partial remainder in accordance with the outputs of the plurality of full adder stages.

In an eighth implementation form of the RBSD divider according to the first aspect or any preceding implementation form of the first aspect, the digit recoder comprising a plurality of first recoders coupled to high inputs of a third plurality of recoders and a fourth plurality of recoders, the plurality of first recoders configured to determine a combination of two N/2-bit first vectors or a combination of a ceiling(N/2)-bit first vector and a floor(N/2)-bit first vector in accordance with the plus output; a plurality of second recoders coupled to low inputs of the third-plurality of recoders and the fourth plurality of recoders, the plurality of second recoders configured to determine a combination of two N/2-bit second vectors or a combination of a ceiling (N/2)-bit second vector and a floor(N/2)-bit second vector in accordance with the minus output; a plurality of third recoders coupled the scaled divisor selection unit, the plurality of third recoders configured to select from one of a high plus output of the plurality of first recoders or a high minus output of the plurality of second recoders in accordance with the plus and minus outputs; and a plurality of fourth recoders coupled the scaled divisor selection unit, the plurality of fourth recoders configured to select from one of a low plus output of the plurality of first recoders or a low minus output of the plurality of second recoders in accordance with the plus and minus outputs.

In a ninth implementation form of the RBSD divider according to the first aspect or any preceding implementation form of the first aspect, further comprising a reciprocal unit operatively coupled to the first operand prescaling unit, the reciprocal unit configured to estimate a reciprocal of the divisor.

In a tenth implementation form of the RBSD divider according to the first aspect or any preceding implementation form of the first aspect, wherein N is equal to 6, N/2 is equal to 3, and wherein the first integer multiple of the scaled divisor is 1, and the additional integer multiples of the scaled divisor are 3, 5, 6, and 7.

In a twelfth implementation form of the RBSD divider according to the first aspect or any preceding implementation form of the first aspect, wherein N is equal to 5, ceiling(N/2) is equal to 3, and floor(N/2) is equal to 2, and wherein the first integer multiple of the scaled divisor is 1, and the additional integer multiples of the scaled divisor are 3, 5, 6, and 7.

In a thirteenth implementation form of the RBSD divider according to the first aspect or any preceding implementation form of the first aspect, wherein N is equal to 4, N/2 is equal to 2, and wherein the first integer multiple of the scaled divisor is 1, and the additional integer multiple of the scaled divisor is 3.

In a fourteenth implementation form of the RBSD divider according to the first aspect or any preceding implementation form of the first aspect, wherein N is equal to 3, ceiling(N/2) is equal to 2, and floor(N/2) is equal to 1, and wherein the first integer multiple of the scaled divisor is 1, and the additional integer multiple of the scaled divisor is 3.

In a fifteenth implementation form of the RBSD divider according to the first aspect or any preceding implementation form of the first aspect, wherein N is equal to 2, N/2 is equal to 1, and wherein the first integer multiple of the scaled divisor is 1.

According to a second aspect, a method implemented by a redundant binary signed digit (RBSD) divider is provided. The method comprising: prescaling, by the RBSD divider, a divisor and a dividend, the divisor and the dividend being inputs to the RBSD divider; and iteratively generating, by the RBSD divider, a quotient and a remainder in accordance with the divisor and the dividend utilizing a recoding of one or more radix $2^N$ multiples of most significant bits of a partial remainder.

In a first implementation form of the method according to the second aspect, the one or more radix $2^N$ multiples of the most significant bits of the partial remainder being recoded into two or more radix $2^N/2$ multiples when N is even.

In a second implementation form of the method according to the second aspect or any preceding implementation form of the second aspect, the one or more radix $2^N$ multiples of the most significant bits of the partial remainder being recoded into one or more radix $2^N$ multiples of the most significant bits of a partial remainder into two or more radix $2^{ceiling(N/2)}$ and radix $2^{floor(N/2)}$ multiples when N is odd.

In a third implementation form of the method according to the second aspect or any preceding implementation form of the second aspect, prescaling the divisor and the dividend comprising: scaling, by the RBSD divider, the divisor by a first scaling factor and one or more additional integer multiples of the first scaling factor; and scaling, by the RBSD divider, the dividend by the first scaling factor.

In a fourth implementation form of the method according to the second aspect or any preceding implementation form of the second aspect, iteratively generating the quotient and the remainder comprising: recoding, by the RBSD divider, an N-bit portion of a partial remainder as a combination of two N/2-bit vectors or a combination of a ceiling(N/2) bit vector and a floor(N/2) bit vector, where 2N is the radix of the N-bit portion of the partial remainder being recoded; selecting, by the RBSD divider, a plurality of the first scaled divisors or the second scaled divisors in accordance with a sign of outputs of the recoding; and compressing, by the RBSD divider, the plurality of the first scaled divisors or the second scaled divisors, and a current partial remainder, an output of the compressing comprising a difference of the current partial remainder and a sum of the plurality of the first scaled divisor or the one or more additional integer multiples of the first scaled divisor.

In a fifth implementation form of the method according to the second aspect or any preceding implementation form of the second aspect, further comprising predicting, by the RBSD divider, a sign of a subsequent partial remainder in accordance with the output of the compressing.

In a sixth implementation form of the method according to the second aspect or any preceding implementation form of the second aspect, recoding the one or more N-bit portions of the partial remainder comprising: determining a combination of two N/2-bit vectors or a combination of a ceiling(N/2)-bit first vector and a floor(N/2)-bit first vector in accordance with a plus output of the partial remainder; determining a combination of two N/2-bit vectors or a combination of a ceiling(N/2)-bit second vector and a floor (N/2)-bit second vector in accordance with a minus output of the partial remainder; selecting one of a high plus output of the combination of two N/2-bit first vectors or the combination of the ceiling(N/2)-bit and the floor(N/2)-bit first vectors, or a high minus output of the combination of two N/2-bit second vectors or the combination of the ceiling(N/2)-bit and the floor(N/2)-bit second vectors in accordance with the plus and minus outputs; and selecting one of a low plus output of the combination of two N/2-bit first vector or the ceiling(N/2)-bit and the floor(N/2)-bit first vectors, or a low minus output of the combination of two N/2-bit second vectors or the ceiling(N/2)-bit and the floor(N/2)-bit second vectors in accordance with the plus and minus outputs.

In a seventh implementation form of the method according to the second aspect or any preceding implementation form of the second aspect, further comprising estimating, by the RBSD divider, a reciprocal of the divisor.

In an eighth implementation form of the method according to the second aspect or any preceding implementation form of the second aspect, wherein N is equal to 6 or 5, and wherein the first multiple of the scaled divisor is 1, and the additional integer multiples of the scaled divisor are 3, 5, 6, and 7.

In a ninth implementation form of the method according to the second aspect or any preceding implementation form of the second aspect, wherein N is equal to 4 or 3, and wherein the first multiple of the scaled divisor is 1 and the additional integer multiple of the scaled divisor is 3.

In a tenth implementation form of the method according to the second aspect or any preceding implementation form of the second aspect, wherein N is equal to 2, and wherein the first multiple of the scaled divisor is 1 and there are no other additional integer multiples of the scaled divisor.

According to a third aspect, a system is provided. The system comprising: a non-transitory memory storage comprising instructions and data; one or more processors in communication with the memory storage, wherein the one or more processors execute the instructions; and an arithmetic unit in communication with the one or more processors and the memory storage, the arithmetic unit comprising: a first operand prescaling unit configured to scale a divisor by a first scaling factor; a scaled divisor selection unit operatively coupled to the first operand prescaling unit, the scaled divisor selection unit configured to receive an output of the first operand prescaling unit, and selectively swap multiples of plus and minus vectors of inputs to the scaled divisor selection unit to produce selected multiples of the scaled divisor, the swapping being in accordance with a predicted sign of a partial remainder; a digit recoder operatively coupled to multiplexers, the digit recoder configured to recode at least one N-bit portion of the partial remainder as a combination of two N/2-bit vectors; and a plurality of full adder stages having inputs operatively coupled to the scaled divisor selection unit and outputs operatively coupled to the multiplexers, the plurality of full adder stages configured to compress a difference of the partial remainder and the selected multiples of the scaled divisor, wherein the outputs of the plurality of full adder stages being in a redundant format.

In a first implementation form of the system according to the third aspect, the first operand scaling unit being further configured to generate one or more additional integer multiples of the scaled divisor.

In a second implementation form of the system according to the third aspect or any preceding implementation form of the third aspect, the arithmetic unit further comprising a second operand scaling unit configured to scale a dividend by the first scaling factor, and generate a first multiple of the scaled dividend.

In a third implementation form of the system according to the third aspect or any preceding implementation form of the third aspect, the arithmetic unit further comprising a sign predictor operatively coupled to the plurality of full adder stages, the sign predictor configured to generate the predicted sign of a subsequent partial remainder in accordance with the outputs of the plurality of full adder stages.

In a fourth implementation form of the system according to the third aspect or any preceding implementation form of the third aspect, the digit recoder comprising: a plurality of first recoders coupled to high inputs of a third plurality of recoders and a fourth plurality of recoders, the plurality of first recoders configured to determine a combination of two N/2-bit first vectors or a combination of a ceiling(N/2)-bit first vector and a floor(N/2)-bit first vector in accordance with the plus output; a plurality of second recoders coupled to low inputs of the third plurality of recoders and the fourth plurality of recoders, the plurality of second recoders configured to determine a combination of two N/2-bit second vectors or a combination of a ceiling(N/2)-bit second vector and a floor(N/2)-bit second vector in accordance with the minus output; a plurality of third recoders coupled the scaled divisor selection unit, the plurality of third recoders configured to select from one of a high plus output of the plurality of first recoders or a high minus output of the plurality of second recoders in accordance with the plus and minus outputs; and a plurality of fourth recoders coupled the scaled divisor selection unit, the plurality of fourth recoders configured to select from one of a low plus output of the plurality of first recoders or a low minus output of the plurality of second recoders in accordance with the plus and minus outputs.

In a fifth implementation form of the system according to the third aspect or any preceding implementation form of the third aspect, the arithmetic unit further comprising a reciprocal unit operatively coupled to the first operand prescaling unit, the reciprocal unit configured to estimate a reciprocal of the divisor. An advantage of a preferred embodiment is that carry-propagate addition used in computing the quotient bits during iterative processing is eliminated. Eliminating the carry propagation in the computing of the quotient bits allows for increased number of bits per cycle, as well as increased clock speed.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Division and square-root operations are difficult to implement on a computer. In general, division is the most complicated basic mathematical operation (addition, subtraction, multiplication, and division) to implement, with the algorithms consuming the most resources (hardware resources, time resources, or both hardware and time resources). Algorithms implementing the square-root operations are similar to those implementing the division operations in nature, and have comparable complexity.

Figure 1:
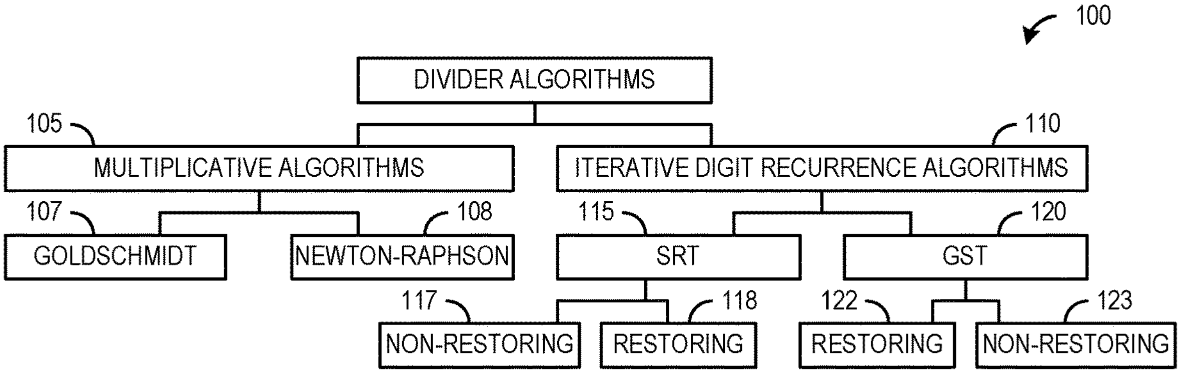
FIG. 1 illustrates a diagram of different divider algorithms.

FIG. 1 illustrates a diagram 100 of different divider algorithms. There are two main classes of divider algorithms: multiplicative algorithms 105 and iterative digit recurrence algorithms 110. Examples of multiplicative algorithms 105 include Goldschmidt division 107 and Newton-Raphson division 108. Goldschmidt division uses an iterative process of repeatedly multiplying both the dividend, X, and divisor, D, by a common factor Fi, chosen such that the divisor converges to 1. This causes the dividend to converge to the sought quotient Q. Newton-Raphson uses Newton's method to find the reciprocal of D and multiply that reciprocal by X to find the final quotient. Iterative digit recurrence algorithms 110 iteratively calculate successive quotient bits. Examples of iterative digit recurrence algorithms 110 include Sweeney-Robertson-Tocher (SRT) division 115

(both non-restoring 117 and restoring 118) and Generalized Svoboda-Tung (GST) division 120 (both restoring 122 and non-restoring 123).

$R_{i+1}=r\cdot R_i-q_i\cdot DR_{i+1}=r\cdot R_i-q_i\cdot(2\cdot Q_{i-1}+r^{-i}\cdot q_i)$ In a deeply-pipelined processor design, Newton-Raphson and Goldschmidt iterations consume many cycles due to dependencies between and within successive iterations. In contrast, SRT and GST division algorithms are iterative algorithms that use recurrence equations to successively calculate the next successive quotient or square-root bits. As an example, the recurrence equation for division is expressible as $$R_{i+1}=r\cdot R_i-q_i\cdot DR_{i+1}=r\cdot R_i-q_i\cdot(2\cdot Q_{i-1}+r^{-i}\cdot q_i).$$

$R_{i+1}=r\cdot R_i-q_i\cdot DR_{i+1}=r\cdot R_i-q_i\cdot(2\cdot Q_{i-1}+r^{-i}\cdot q_i)$ The recurrence equation for square-roots is expressible as $$R_{i+1}=r\cdot R_i-q_i\cdot DR_{i+1}=r\cdot R_i-q_i\cdot(2\cdot Q_{i-1}+r^{-i}\cdot q_i).$$

$R_{i+1}=r\cdot R_i-q_i\cdot DR_{i+1}=r\cdot R_i-q_i\cdot(2\cdot Q_{i-1}+r^{-i}\cdot q_i)$ Where, for both recurrence equations, r is the radix, R is the partial remainder, $q_i$ is the computed quotient digit, D is the divisor, i is the iteration counter, and $Q_i$ is the developed root.

Figure 2A:
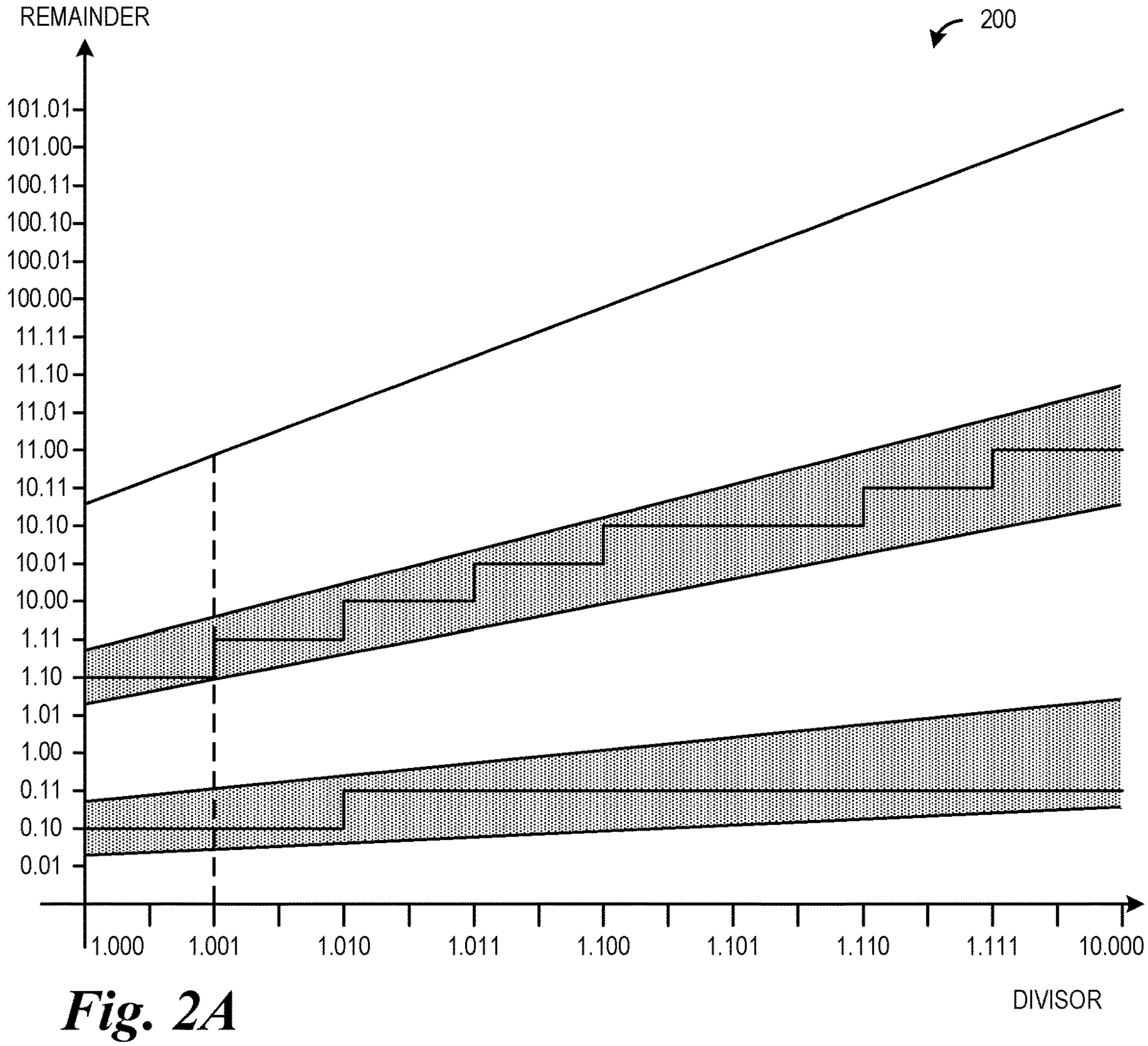
Fig. 2A (Prior Art)
FIG. 2A illustrates a prior-art partial remainder-divider diagram for a radix-4 digit set of a Sweeney-Robertson-Tocher (SRT) algorithm.

A disadvantage of existing SRT algorithm implementations is that they are generally restricted to 2 to 3 bits per cycle (i.e., radix-4 to radix-8) because of their reliance on complex quotient selection tables, which depend on both the partial remainder and the divisor. FIG. 2A illustrates a prior-art partial remainder-divider diagram 200 for a radix-4 digit set of an SRT algorithm.

Partial remainder-divider diagram 200 presents the quotient digit selection of an SRT algorithm with radix-4 for different divisor and partial remainder values.

$$Q_{division}=\frac{N}{D}=\frac{N\cdot k}{D\cdot k}Q_{square-root}=\frac{X}{Q_s}=\frac{X\cdot k}{Q_s\cdot k}=\frac{X'}{Q_s'}$$

In general, the GST algorithms are superior to the SRT algorithms because the GST algorithms allow a higher number of bits to be calculated per cycle by prescaling the dividend and the divisor. The divisor is scaled to that it is close to 1.0. The equations for the result Q (quotient in division operations and root in square root operations) are expressible as $$Q_{division}=\frac{N}{D}=\frac{N\cdot k}{D\cdot k}Q_{square-root}=\frac{X}{Q_s}=\frac{X\cdot k}{Q_s\cdot k}=\frac{X'}{Q_s'}$$

$$Q_{division}=\frac{N}{D}=\frac{N\cdot k}{D\cdot k}Q_{square-root}=\frac{X}{Q_s}=\frac{X\cdot k}{Q_s\cdot k}=\frac{X'}{Q_s'}\text{ and}$$

$$Q_{division}=\frac{N}{D}=\frac{N\cdot k}{D\cdot k}Q_{square-root}=\frac{X}{Q_s}=\frac{X\cdot k}{Q_s\cdot k}=\frac{X'}{Q_s'}$$

$$Q_{division}=\frac{N}{D}=\frac{N\cdot k}{D\cdot k}Q_{square-root}=\frac{X}{Q_s}=\frac{X\cdot k}{Q_s\cdot k}=\frac{X'}{Q_s'}$$

where k is the scaling factor.

Figure 2B:
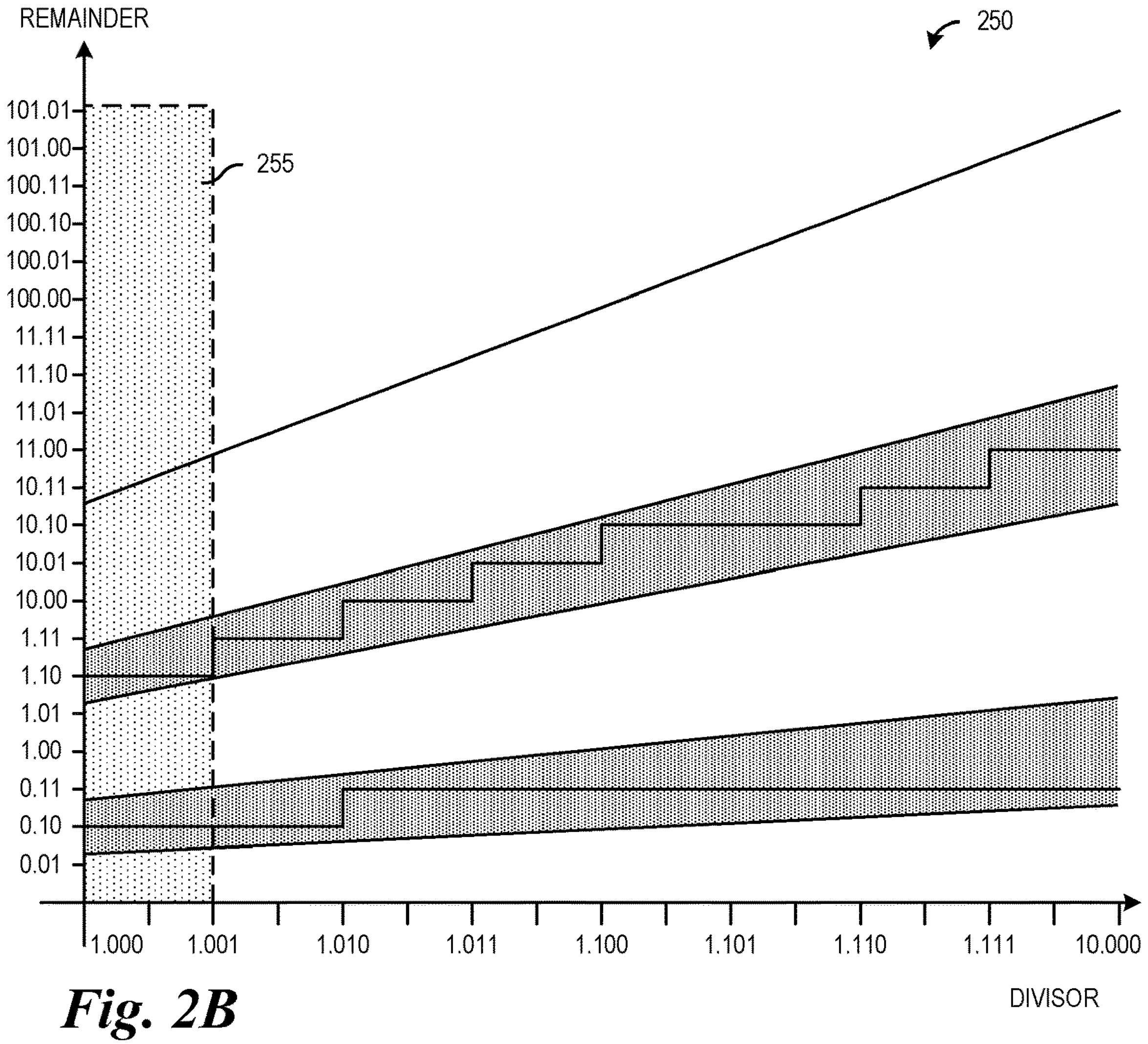
Fig. 2B (Prior Art)
FIG. 2B illustrates a prior-art partial remainder-divider diagram for a radix-4 digit set with prescaled range.

Prescaling the dividend and the divisor so that the scaled dividend is close to 1.0 allows for the quotient estimate to be determined directly from the bits of the partial remainder in each iteration without requiring the use of a look-up table. FIG. 2B illustrates a prior-art partial remainder-divider diagram 250 for a radix-4 digit set with prescaled range. As shown in FIG. 2B, region 255 highlights an interval in which the quotient does not depend upon the divisor. Hence, by scaling the divisor and the dividend by the same amount so that the scaled divisor is within region 255, the quotient digits, for each iteration, can be determined directly from the partial remainder.

Figure 2C:
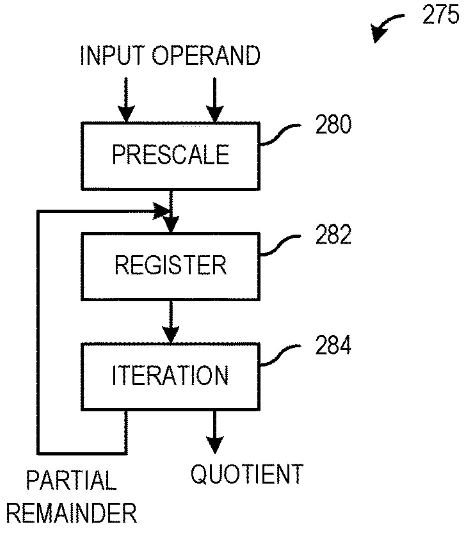
Fig. 2C (Prior Art)
FIG. 2C illustrates a high-level view of a prior art Generalized Svoboda-Tung (GST) divider.

FIG. 2C illustrates a high-level view of a prior art GST divider 275. GST divider 275 includes a prescale circuit 280 that prescales the dividend and the divisor, and a register 282 that stores the scaled dividend and divisor. An iteration circuit 284 controls the iteration of the implementation of the GST algorithm, such as determining the stopping point of the GST algorithm, etc. Iteration circuit 284 outputs the quotient, as well as the partial remainder. If iteration circuit 284 determines that the stopping point is not reached, GST divider 275 provides the partial remainder to register 282 for another iteration of the GST algorithm.

Figure 3:
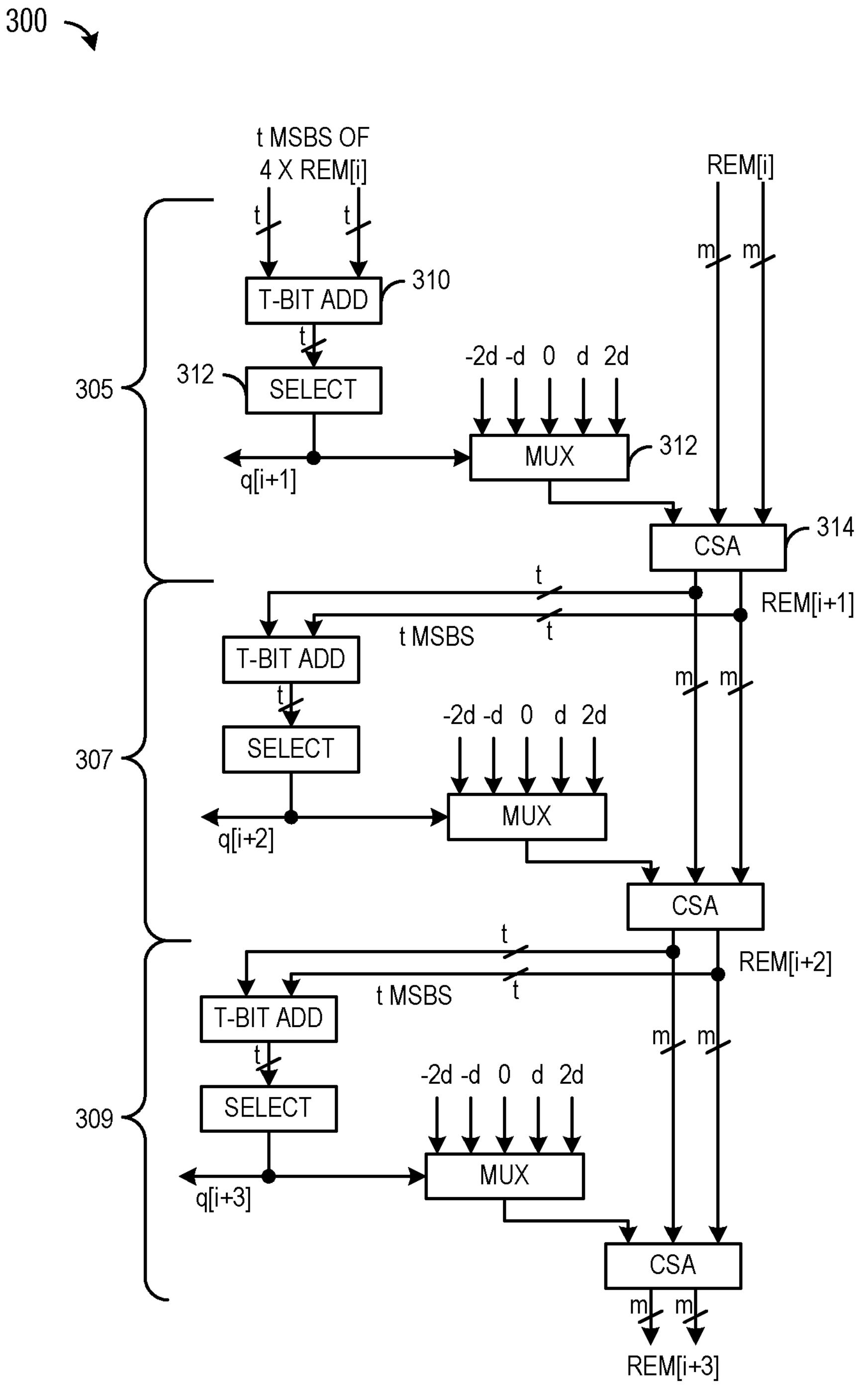
Fig. 3 (Prior Art)
FIG. 3 illustrates a prior-art GST divider highlighting cascaded iteration stages.

FIG. 3 illustrates a prior-art GST divider 300 highlighting cascaded stages. GST divider 300 includes three cascaded stages 305, 307, and 309, with each stage implementing the GST algorithm for a portion of bits. The GST algorithm supports low-radix stages (radix-4 in this example) that are easily implemented. As an example, stage 305 implements the GST algorithm and produces two bits of the quotient. Stage 305 includes a t-bit adder 310 that adds the t most significant bits (MSBs) of the partial remainder to the scaled version of the t MSBs of the partial remainder. A select 312 selects a two-bit quotient value [−2, −1, 0, +1, +2] that is also used as a select for multiplexer (MUX) 312 to select from the [−2X, −X, 0, +X, +2X] multiples of the scaled divisor. Stage 305 also includes a carry save adder (CSA) 314 that adds m bits of the partial remainder and output of MUX 312. The stages may be identical to each other.

Output of stage 305 is used as input to stage 307, and so forth. Hence, the delay of the CSAs is linear and is dependent on the number of stages. Each stage also includes a carry propagate adder on the upper bits of the partial remainder, which adds significant delay. The stages also scale with adder width and are not carry free.

In SRT and GST iterative division and square root algorithms, cycle time may be decreased by keeping the partial remainder in redundant binary signed digit (RBSD) format, which helps to improve overall performance. In the RBSD format, the partial remainder may be represented as a sum of two vectors: a Plus (+) vector and a Minus (−) vector. An advantage of using the RBSD format is that the computation of the recurrence equation for a new partial remainder (expressible as $R_{i+1}=r\cdot R_i-q_i\cdot D$ for the division algorithm, the recurrent equation for the square root algorithm is similar) can also be performed in the RBSD format. The computation of the recurrence equation is carry free. In this context, carry free means that the computation of the recurrent equation may be performed independent of carry propagation, no matter the vector length.

However, the computation of the quotient digits remains a bottleneck. The quotient digits must be produced by summing the MSBs of the partial remainders using a carry propagate adder (CPA).

Figure 4:
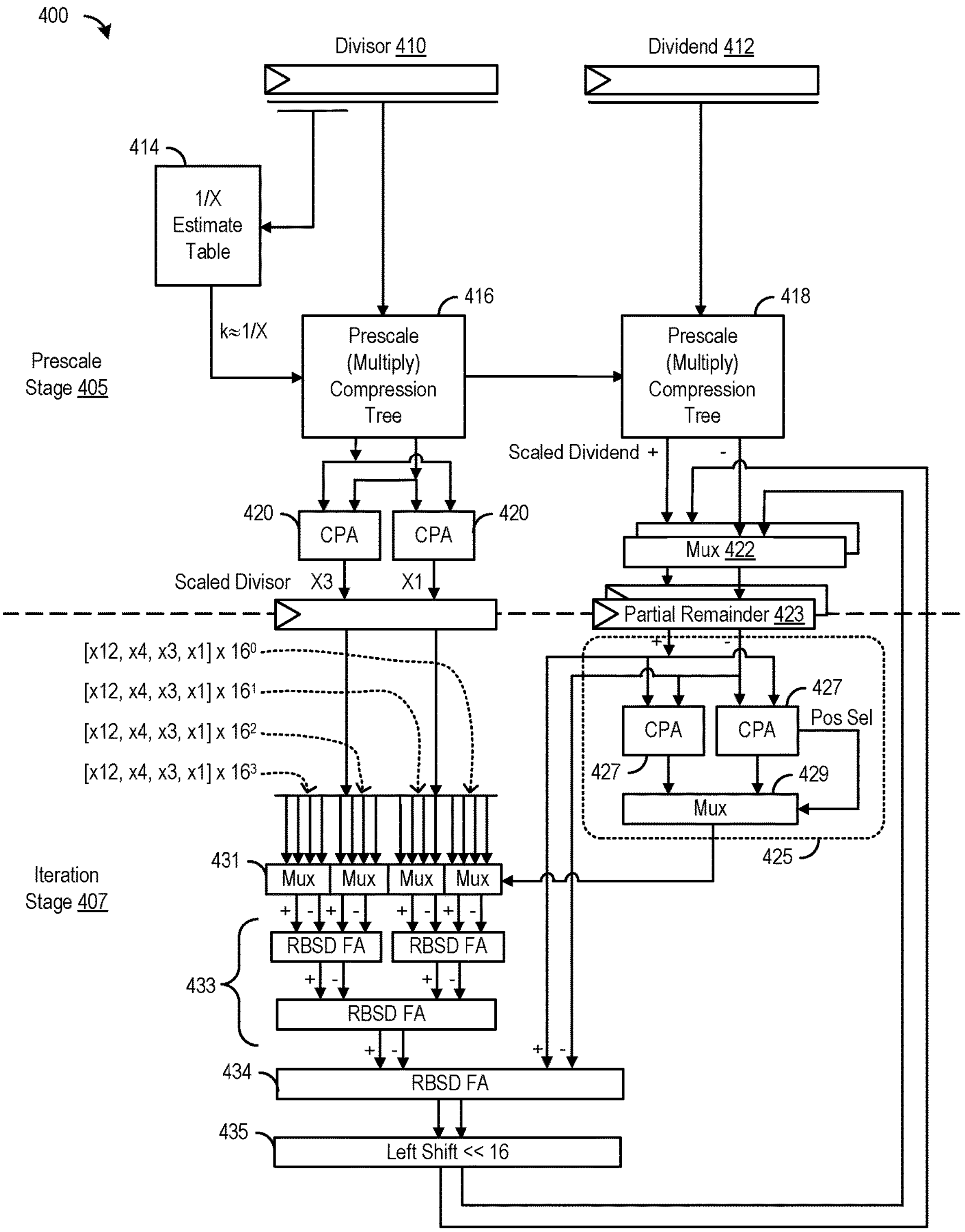
Fig. 4 (Prior Art)
FIG. 4 illustrates a single stage of a prior-art radix-64K (16-bits/cycle) GST divider with values represented in the redundant binary signed digit (RBSD) format.

FIG. 4 illustrates a single stage of a prior art radix-64K GST divider 400 with values represented in the RBSD format. GST divider 400 operates on multiple 4-bit sections of the Plus and Minus vectors of the scaled dividend (or partial remainder). As an example, GST divider 400 operates on multiple 4-bit sections of the partial remainder Plus vector expressible as P[4i+3:4i]*[$16^0$, $16^1$, $16^2$, $16^3$], which are positive multiples from 0× to 15×*[$16^0$, $16^1$, $16^2$, $16^3$], as well as multiple a 4-bit portions of the Minus vector expressible as M[4i+3:4i] *[$16^0$, $16^1$, $16^2$, $16^3$], which are negative multiples from 0× to 15×*[$16^0$, $16^1$, $16^2$, $16^3$]. As shown in FIG. 4, the partial remainder or scaled dividend is expressed as Plus and Minus RBSD vectors.

GST divider 400 includes a prescale stage 405 and an iteration stage 407. Prescale stage 405 is configured to prescale a divisor vector 410 and a dividend vector 412. As shown in FIG. 4, prescale stage 405 scales the divisor and the dividend by some scaling factor k, which is an approximation to the reciprocal estimate of the divisor (k≈1/X), where X=divisor. In general, the higher the radix of the divide unit, the closer the reciprocal approximation, k, must be to the actual exact reciprocal estimate 1/X.

A reciprocal unit 414 determines the reciprocal estimate k≈1/X of divisor vector 410 and may be implemented using an estimate table, for example. Prescalers 416 and 418 multiply divisor vector 410 and dividend vector 412 with the prescaling factor, k. Prescaler 416 produce an output in redundant form, and may be implemented using a compression tree in any suitable redundant format, for example carry-save, carry-borrow, redundant binary signed-digit (RBSD), or any other. Prescaler 418 produces an output in redundant binary signed-digit format. CPAs 420 generate the X3 and X1 scaled divisors from the output of prescaler 416, and multiplexers 422 generate the scaled dividend plus/minus vectors in RBSD format from the output of prescaler 418. The X3 scaled divisor represents 3k*divisor, whereas the X1 scaled divisor represents k*divisor.

Iteration stage 407 includes a digit recoder 425 configured to recode 4-bit portions of the MSBs of the selected non-redundant dividend, the output of mux 429, into a combination of 2-bit values. For radix-64K GST divider 400, digit recoder 425 recodes 4-bit portions of the dividend (a total of 16 possible values: 0-15) into a combination of 2-bit values (a total of 4 values: 0-3 and 4 times multiples thereof). A detailed discussion of the digit recoding is provided below.

Digit recoder 425 includes CPAs 427 that add the MSBs of the dividends (plus and minus) and a multiplexer 429 that selects a recoded digit based on the actual sign of the dividend. The selected recoded digit is the output of digit recoder 425.

The output of digit recoder 425 is provided to multiplexers 431 that select multiples of the scaled divisor [(0, 1, 2, 3)×4, (0, 1, 2, 3)]×[$16^3$, $16^2$, $16^1$, $16^0$], to add using RBSD full adders 433. RBSD FA 434 subtracts all of the multiples of the scaled dividend from partial remainder 423. Output of RBSD FA 434 is provided to shifter 435 to shift the output by 4 (i.e., multiply by 16). The output of shifter 435 is the output partial remainder of the stage and may be provided to multiplexer 422 for a subsequent iteration.

GST divider 400 still requires carry propagate subtraction for multiple 4-bit portions, where the carry propagate subtractors, as well as extra carry propagate subtraction bits, are needed for sign and fraction. Furthermore, the positive difference is needed after the carry propagate subtractors. Due to the continued requirement for carry propagate adders, a radix-64 design would require carry propagate adders that are 20-bits wide, which have significant delay and would increase cycle time.

Figure 5:
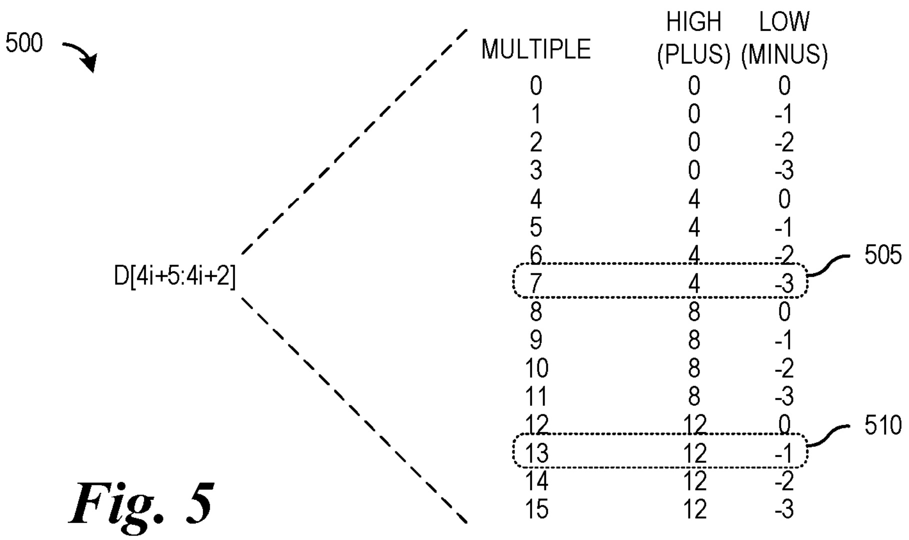
FIG. 5 illustrates a digit recoding of a 4-bit value to a combination of 2-bit values.

FIG. 5 illustrates a prior art digit recoding 500 of a higher-radix 4-bit value to a combination of lower-radix 2-bit values. A 4-bit value can be any of 16 multiples, ranging from 0 to 15, for example. As shown in FIG. 5, it is possible to express any of the 16 higher-radix multiples as a combination of lower-radix 2-bit values. As an example, any of the 16 multiples may be expressed as Multiple=4*High(Plus)_Vector_Value−Low(Minus)_Vector_Value, where the High(Plus)_Vector_Value has a range of [0, 1, 2, 3] and the Low(Minus)_Vector_Value has a range of [0, −1, −2, −3]. All vector values represent multiples of the scaled divisor.

For discussion purposes, consider multiple 7 (shown in highlight 505). Multiple 7 may be expressed as a combination of 7=4*1−(−3)=4+3=7. Similarly, multiple 13 (shown in highlight 510) may be expressed as a combination of 13=4*3−(−1)=12+1=13. Other multiples may also be similarly expressed.

As discussed previously, the prior art GST divider with the digit recoding of FIG. 5 still requires carry propagate subtraction for the sign and fraction bits, as well as the need for the positive difference after the carry propagate subtractors. Hence, the prior art GST divider does not scale well for high radix operation due to the extended delays associated with carry propagate adders having high bit-width.

According to an example embodiment, methods and apparatus for a high performance divide or square-root unit with multi-stage quotient digit recoding are provided. The multi-stage quotient digit recoding recodes the upper bits of the Plus and Minus vectors of the partial remainder into combinations of lower-radix multiples over multiple stages so that carry propagate addition is not utilized. The elimination of carry propagate addition enables the use of higher radix operations without incurring extended delays that slow the operations.

Figure 6:
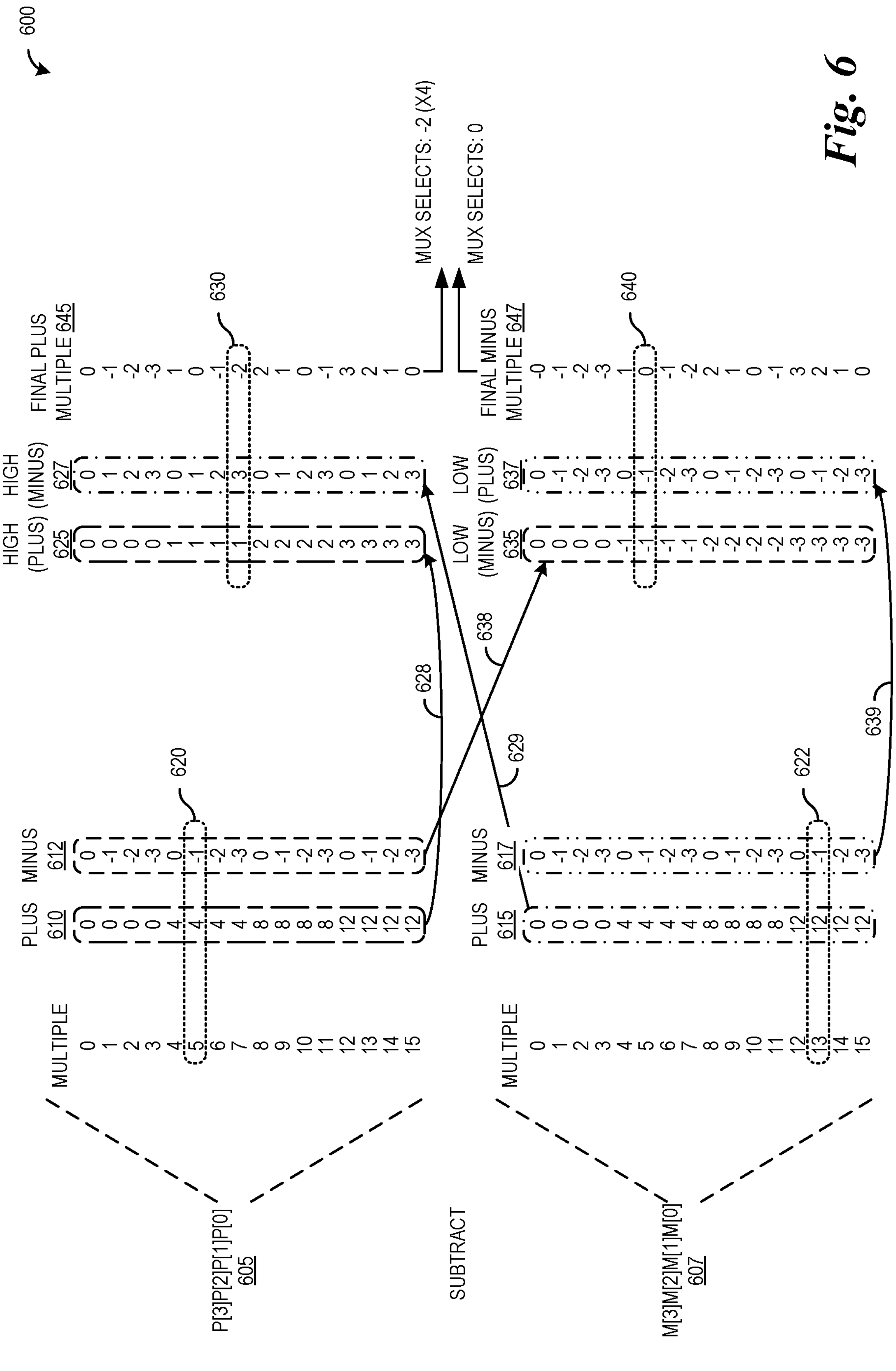
FIG. 6 illustrates an example multi-stage quotient digit recoding according to example embodiments presented herein.

FIG. 6 illustrates an example multi-stage quotient digit recoding 600. Multi-stage quotient digit recoding 600 illustrates radix-16 recoding, which applies to 4-bit portions of the Plus and Minus vectors of the partial remainder. However, the multi-stage quotient digit recoding presented herein are applicable to other radix values, such as radix-64 (6-bit portions of the vectors), radix-256 (8-bit portions of the vectors), radix-1024 (10-bit portions of the vectors), and so on (any even number of bit portions of the vectors). In addition, an alternate embodiment of the invention is applicable to odd number of bit portions of the vectors. Therefore, the discussion of radix-16 recoding should not be construed as being limiting to the scope of the example embodiments.

Rather than using carry propagate addition, each of the 4-bit portions of both the Plus and Minus vectors are recoded into two additional vectors that can represent all possible combinations of multiples 0 to 15 by the expression Multiple=4*High(Plus)_Vector_Value−Low(Minus)_Vector_Value, where the High(Plus)_Vector_Value has a range of [0, 1, 2, 3] and the Low(Minus)_Vector_Value has a range of [0, −1, −2, −3]. All vector values represent multiples of the scaled divisor.

However, unlike the digit recoding described previously, the quotient digit recoding presented herein occurs in two stages. The first stage individually recodes the 4-bit portions of both the Plus vector and the 4-bit portions of the Minus vector to combinations of lower radix High (Plus) Vector multiples and Low (Minus) Vector multiples as in the prior art encodings. The second stage recodes the High portion of the first stage Plus vector (range=4*[0, 1, 2, 3]) and the High portion of the first stage Minus vector (range=4*[0, 1, 2, 3]). Similarly, the second stage also recodes the Low portion of the Plus vector and the Low portion of the Minus vector. The key takeaway is that the digit set of the resultant sum is +/−4*[0, 1, 2, 3], that is, the same lower-radix digit set as the output of the first recoding stage, but instead of being all positives or all negatives (aside from zero) the output of the second recoding stage is a Plus vector and a Minus vector with a digit set of both + and − multiples, which is easily obtained. To form a '−' multiple instead of a '+' multiple (or vice-versa) in RBSD format the '+' and '−' inputs to the RBSD full adder are simply swapped.

For illustrative purposes, consider the situation shown in FIG. 6, where radix-16 Plus and Minus vector multiples are recoded to radix-4 Plus and Minus vector multiples. The range of a radix-4 Plus vector multiple is [0, 1, 2, 3], while the range of a radix-4 Minus vector multiple is [0, −1, −2, −3]. The Plus vector may also be referred to as a High vector and the Minus vector may also be referred to as a Low vector, because the weight of the High vector is 4× the weight of the Low vector.

Hence, in the first stage of recoding, each multiple (e.g., a Plus vector multiple and a Minus vector multiple), which ranges from 0 to 15, may be represented as a sum of two radix-4 vectors, each of which has a range from 0 to 3. In the example shown in FIG. 6, a 4-bit portion 605 of the Plus vector is multiple 5, which may be expressed as a combination of 4×(Plus vector multiple 610)−(Minus vector multiple 612)=4×(1)−(−1)=4−(−1)=5, this is shown as highlight 620. Similarly, a 4-bit portion 607 of the Minus vector is multiple 13, which may be expressed as a combination of 4×(Plus vector multiple 615)−(Minus vector multiple 617)=4×(3)−(−1)=12−(−1)=13, this is shown as highlight 622.

The recodings of the 4-bit portions 605 and 607 of the Plus vector and the Minus vector, as produced by the first stage of recoding, are provided to the second stage of recoding. In the second stage of recoding, the High (Plus) vectors from the first stage recoding of the 4-bit portion 605 of the High (Plus) vector and the 4-bit portion 607 of the High (Minus) vector (i.e., High (Plus) vector multiple 610 and High (Plus) vector multiple 615) are combined to produce a final High (Plus) multiple.

High (Plus) vector multiple 610, which corresponds to 4-bit portion 605 (the original Plus vector), becomes High (Plus) vector multiple 625 of the Plus vector multiple of the second stage of recoding. This relationship is shown as mapping 628. High (Plus) vector multiple 615, which corresponds to 4-bit portion 607 (the original Minus vector), becomes High (Minus) vector multiple 627 of the Plus vector multiple of the second stage of recoding. This relationship is shown as mapping 629. The combination of High (Plus) vector multiple 625 and High (Minus) vector multiple 627 is expressible as 4× High (Plus) vector multiple 625−4× High (Minus) vector multiple 627=4×(1)−4×(3)=4×(−2)=4−12=−8, this is shown as highlight 630. A final High (Plus) multiple 645 is then −2 in this instance.

Low (Minus) vector multiple 612, which corresponds to 4-bit portion 605 (the original Plus vector), becomes Low (Minus) vector multiple 635 of the Low (Minus) vector multiple of the second stage of recoding. This relationship is shown as mapping 638. Low (Minus) vector multiple 617, which corresponds to 4-bit portion 607 (the original Minus vector), becomes Low (Plus) vector multiple 637 of the Low (Minus) vector multiple of the second stage of recoding. This relationship is shown as mapping 639. The combination of High (Minus) vector multiple 635 and Low (Plus) vector multiple 637 is expressible as Low (Plus) vector multiple 637−Low (Minus) vector multiple 635=−1−(−1)=−1+1=0, this is shown as highlight 640. A final Low (Minus) multiple 647 is then 0 in this instance.

Final Plus multiple 645 and final Minus multiple 647 is the recoding of the 4-bit portions 605 and 607 of the original Plus and Minus vectors.

Although the above example focuses on radix-16 recoding, the example embodiments presented herein are operable with other radix recoding. As an example, radix-64 recoding may be performed utilizing the following multiples:

Plus vector multiples: 8×[7, 6, 5, 4, 3, 2, 1, 0]

Minus vector multiples: −[7, 6, 5, 4, 3, 2, 1, 0].

Using radix-64 recoding, 6-bits worth of multiples can be recoded per multiple pair. A slight issue arising from higher radix recoding is the addition of hard multiples 5×, 6×, and 7×, which must be pre-computed, just as the hard multiple 3× is computed with the current radix-16 recoding. However, the use of the four hard multiples (3×, 5×, 6×, and 7×) may be justified in some situations. Other radix recoding may also be possible, such as radix-256, radix-1024, and so on. Therefore, the focus on radix-16 should not be construed as being limiting to the scope of the example embodiments.

The appendix attached hereto include example multi-stage quotient digit recoding for N=2, 3, 4, 5, and 6.

Figure 7:
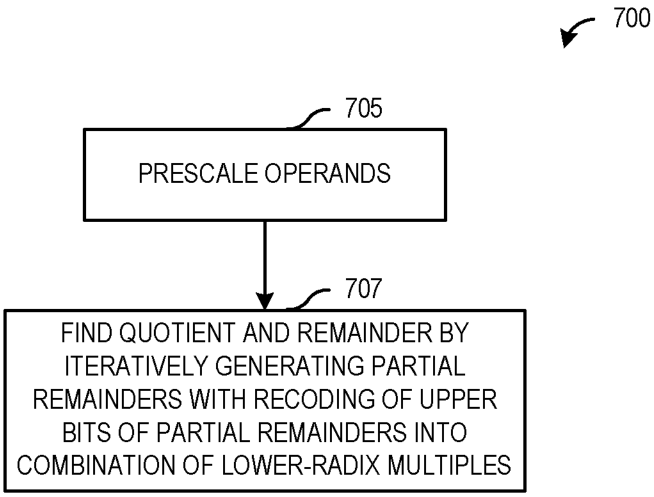
FIG. 7 illustrates a flow diagram of high-level operations occurring in an arithmetic unit using a digit recurrence algorithm to perform division or square-root operations according to example embodiments presented herein.

FIG. 7 illustrates a flow diagram of high-level operations 700 occurring in an arithmetic unit using a digit recurrence algorithm to perform division or square-root operations. Operations 700 include the arithmetic unit prescaling operands (block 705). The prescaling of the operands includes scaling the divisor so that the product of the reciprocal estimate of the divisor, k, times the divisor (resulting in the scaled divisor) is close to 1.0. The scaling of the divisor so that the scaled divisor is close to 1.0 simplifies the generation of the quotient bits by reading the quotient bits directly from the partial remainder, instead of using a look-up table. The prescaling of the operands also includes prescaling the divisor for the hard multiples used in the radix recoding. As an example, for radix-16 recoding, the scaled divisor is prescaled by a factor of 3. As another example, for radix-64 recoding, the divisor is further multiplied by factors of 3, 5, 6, and 7. Finally, the dividend is scaled by the same reciprocal estimate prescaling factor, k, to form a scaled dividend. The scaled dividend is kept in redundant (Plus and Minus) RBSD format to form the initial partial remainder.

The arithmetic unit also finds the quotient and remainder by iteratively generating partial remainders (block 707). The iterative generation of the partial remainder utilizes the multi-stage digit recoding of N-bit portions of the Plus and Minus vectors of the operands into N/2-bit portions, where the arithmetic unit implements radix-$2^N$ operations. The recoded bits may be used to select various multiples of the scaled divisor. The use of the multi-stage digit recoding enables the elimination of carry propagate adders, which removes the delay associated with the carry propagate adders. Additionally, the delay no longer scales directly with the $\log_2$ of the radix of the arithmetic, which enables higher radix operations without incurring extended delay.

Although the discussion presented herein focusses on dividers and division operations, the example embodiments are operable with square-root operations. Therefore, the discussion of dividers should not be construed as being limiting to the scope of the example embodiments.

Figure 8:
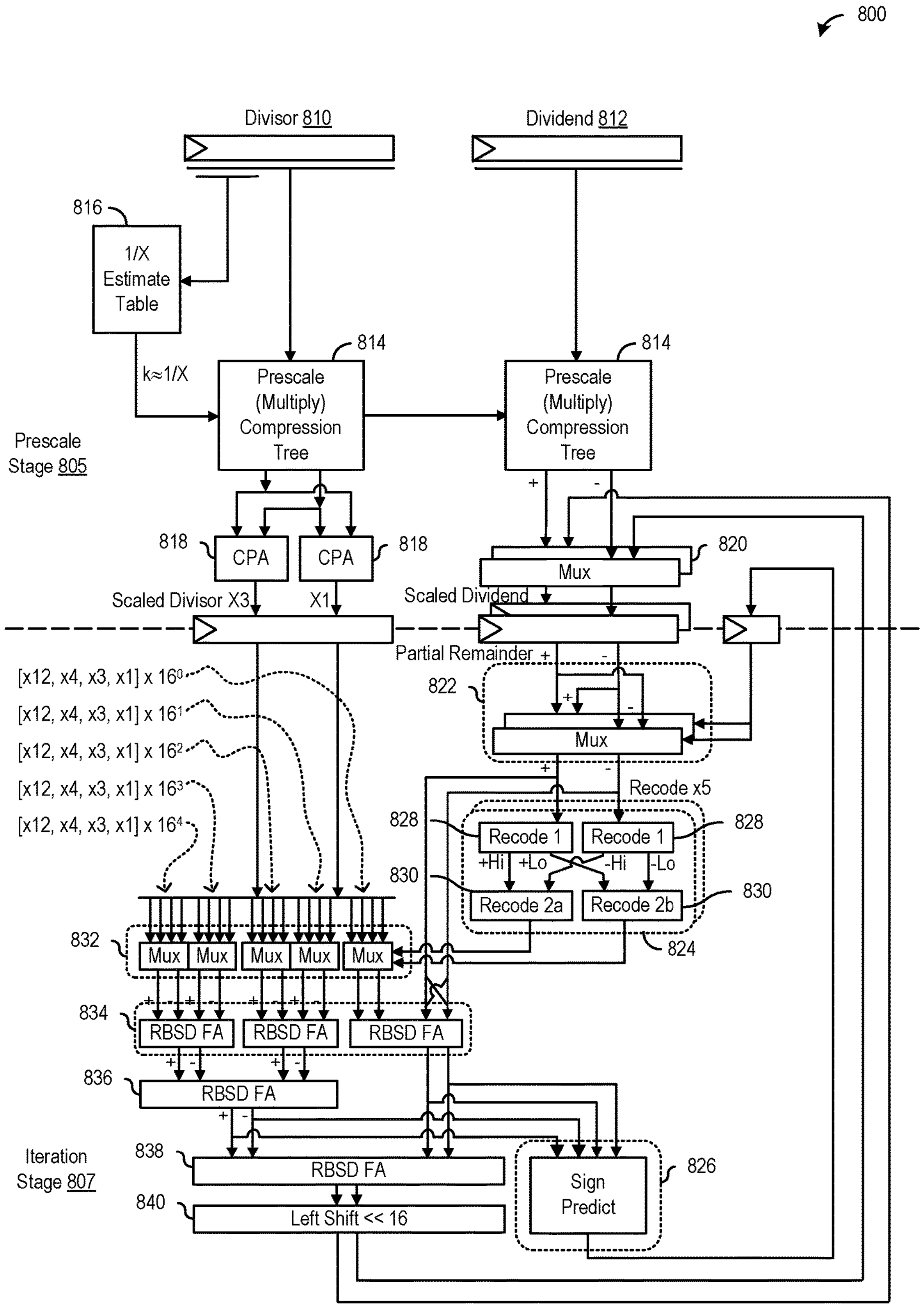
FIG. 8 illustrates an example GST divider according to example embodiments presented herein.

FIG. 8 illustrates an example GST divider 800. GST divider 800 implements radix-16 division and utilizes multi-stage digit recoding to eliminate carry propagate adders, thereby eliminating radix dependent delays. GST divider 800 includes a prescale stage 805 and an iteration stage 807. Operands, such as a divisor 810 and a dividend 812, are in normal binary format.

Prescale stage 805 scales the product of the divisor 810 and the reciprocal estimate, k, of the divisor from the 1/X estimate table 816, close to 1.0, where how close the scaled divisor is to 1.0 being dependent on the number of bits per cycle processed by GST divider 800.

As discussed previously, prescale stage 805 also prescales operands in accordance with the hard multiples. As an example, for radix-16 operation, prescale stage 805 prescales the scaled divisor from the redundant output of the compression tree 814 by a factor of 3 by CPA 818 to form the scaled divisor X3.

The prescaling of the dividend 812 is performed by prescale unit 814. Prescale unit 814 may implement the prescaling using a compression tree, for example. Prescale unit 814 may operate in a carry-save, RBSD, or any other redundant format. However, if the prescaling is not performed in RBSD format, then the output of the dividend prescaling compression tree must be converted to RBSD format before being latched by the partial remainder register.

Carry propagate adders 818 adds the redundant outputs of prescale unit 814 and outputs the prescaled divisor (scaled divisor X1), as well as the prescaled divisor times three (scaled divisor X3). As an example, the 1× scaled divisor is calculated using the sum and carry outputs or the Plus and Minus outputs of prescale unit 814 and combining the outputs using a carry propagate adder. As an example, the 3× scaled divisor is calculated from the 1× and 2× sum and carry or the 1× and 2× Plus and Minus outputs of prescale unit 814 through a 4:2 carry save adder or a RBSD full adder, with the result being combined in a carry propagate adder, to form a non-redundant sum. Compression of the scaled divisor may alternatively be performed natively in the RBSD format.

Multiplexers 820 select the prescaled dividend or an output of iteration stage 807 (a partial remainder from a prior iteration, i.e., a previous partial remainder) and produce a current partial remainder. In an initial iteration, the prescaled dividend is provided to iteration stage 807. In subsequent iterations, the previous partial remainder is passed to iteration stage 807. A partial remainder of the current iteration may be referred to as a current partial remainder. A partial remainder for an iteration occurring after the current iteration may be referred to as a subsequent partial remainder.

In iteration stage 807, multiplexers 822 selectively switch from Plus or Minus vectors of the partial remainder to provide to digit recoding unit 824. A predicted sign of the partial remainder, as produced by sign predict unit 826, selects which one of the Plus or Minus vectors of the partial remainder. As an example, if the predicted sign is positive, then the Plus vector of the partial remainder is provided to a Plus input of digit recoding unit 824 and the Minus vector of the partial remainder is provided to a Minus input of digit recoding unit 824. If the predicted sign is negative, then the Plus vector of the partial remainder is provided to the Minus input of digit recoding unit 824 and the Minus vector of the partial remainder is provided to the Plus input of digit recoding unit 824.

Sign predict unit 826 may be initially set to 0 or positive for the initial partial remainder (e.g., the scaled dividend). While, for successive iterations, sign predict unit 826 predicts the sign of the partial remainder from the previous partial remainder as produced by iteration stage 807. Sign predict unit 826 may have as inputs the inputs to RBSD full adder 838, which are two Plus vectors and two Minus vectors. Alternately, the sign predict unit 826 may have as inputs the inputs of the Left Shift 840, which is a single Plus vector and a single Minus vector. As an example, the inputs to sign predict unit 826 comprises two Plus and two Minus vectors, the difference of which comprise a signed, two's complement value. Since this value represents the difference between the current partial remainder and a multiple of the scaled divisor, the first 18 bits (for a radix-64K design) of this value will be either all zeros or all ones, indicating either a positive or negative partial remainder. When left shifted by 16 bits, this value will comprise a sign bit (1 bit), an overflow bit (1 bit), an integer quotient value (16 bits), and fractional bits (2 bit), for a total of 20 bits of the next partial remainder. Thus, the inputs to the Sign Predict 826 represent the pre-shifted bits of the next partial remainder. For each bit position, each bit may be marked as Plus, Minus or Zero. The partial remainder may be determined to be negative if the leading bit is a Minus or if the leading bits of a sequence are Zeroes followed by a Minus. Sign predict unit 826 may alternatively use a parallel prefix to determine a succession of leading Zero bits.

Digit recoding unit 824 includes two first recoders 828 (one each of the Plus vector and the Minus vector) and two second recoders 830, with one second recoder coupled to the Plus outputs of the two first recoders 828 (this second recoder 830 selects the Plus multiple) and another second recoder coupled to the Minus outputs of the two first recoders 828 (this second recoder 830 selects the Minus multiple).

The Plus or Minus scaled divisor multiples are selected (using multiplexers 832) by the outputs of the two second recoders 830 (i.e., the output of digit recoding unit 824). If the outputs of the two second recoders 830 are positive, then the Minus scaled divisor multiple is selected and passed to RBSD full adders 834. Conversely, if the outputs of the two second recoders 830 are negative, then the Plus scaled divisor multiple is selected and passed to RBSD full adders 834. This is to insure that the selected scaled multiple of the divisor is subtracted from the partial remainder, not added to the partial remainder. In an embodiment, a number of multiplexers in multiplexers 832 is equal to a sum of the number of integer bits (equals to the number of bits per cycle) and the number of additional fraction bits (t).

In general, the RBSD full adders 834 provide a 2:1 compression for multiples of the 4-bit portions. Granularity to 2-bits may be provided by using a type plus-plus-minus (PPM) block driven by one of the second recoders 830 for a Plus term or a type minus-minus-plus (MMP) block driven by the other of the second recoders 830 for a Minus term. Additional RBSD full adders 836 and 838 provide further 2:1 compression.

A shifter 840 provides shifting, which for the bits selected as inputs are bits that will become the 20 most significant bits. Therefore, the bits selected are $b_{MSB-16}$, $b_{MSB-17}$, . . . , $b_{MSB-35}$. The number of bits presented in the discussion of the example presented in FIG. 8 is representative of a radix-16 divider. Different numbers of bits and bit selections are possible for GST dividers with different radix and precision.

Figure 9:
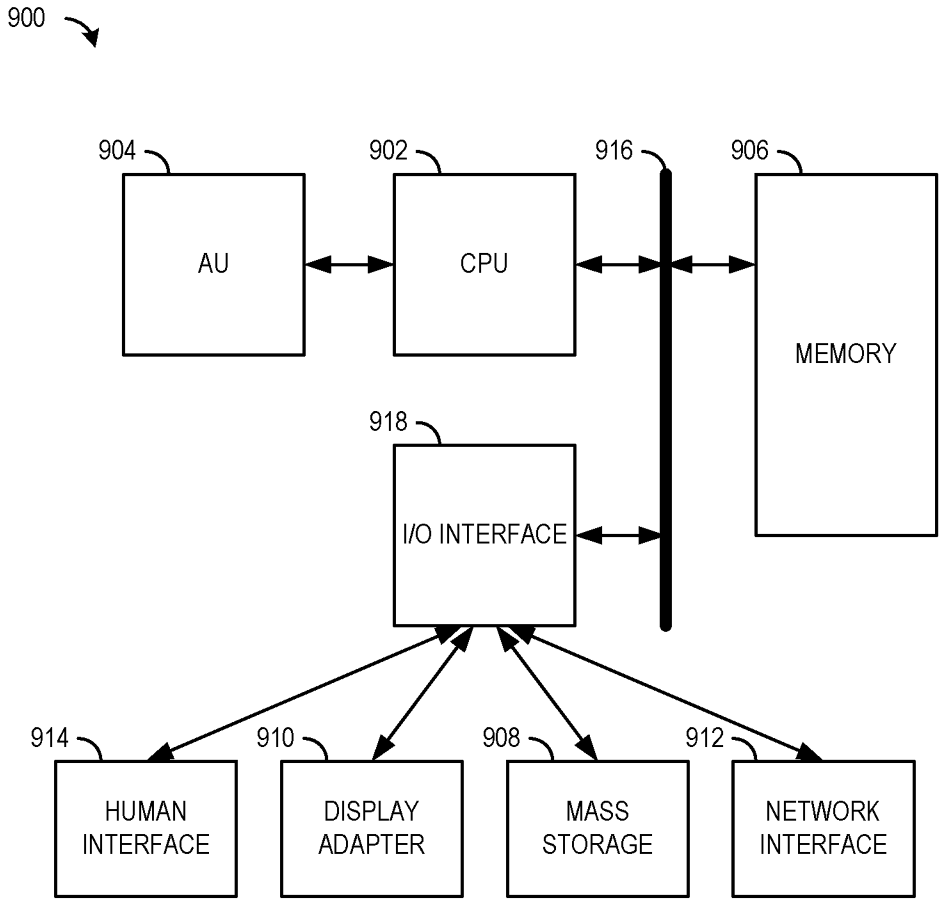
FIG. 9 illustrates a block diagram of a computing system that may include the methods and apparatus disclosed herein.

FIG. 9 illustrates a block diagram of a computing system 900 that may include the methods and apparatus disclosed herein. For example, computing system 900 may include an arithmetic unit that is capable of using multi-stage digit recoding to eliminate carry propagate adders in the implementation of some arithmetic operations.

Specific computing systems may utilize all of the components shown or only a subset of the components, and levels of integration may vary from device to device. Furthermore, a computing system may contain multiple instances of a component, such as multiple processing units, processors, memories, transmitters, receivers, etc. The computing system 900 includes a processing unit (CPU) 902, an arithmetic unit (AU) 904, memory 906, and may further include mass storage 908, a display adapter 910, a network interface 912, human interface 914. Although shown as a single unit, CPU 902 may be implemented as multiple processing units. Mass storage 908, display adapter 910, network interface 912, and human interface 914 may be connected to a bus 916 or through an I/O interface 918 connected to bus 916.

Mass storage 908 may comprise any type of non-transitory storage device configured to store data, programs, and other information and to make the data, programs, and other information accessible via bus 916. Mass storage 908 may comprise, for example, one or more of a solid state drive, hard disk drive, a magnetic disk drive, or an optical disk drive.

Display adapter 910 and I/O interface 918 provide interfaces to couple external input and output devices to the CPU 902. As illustrated, examples of input and output devices include a display coupled the video adapter 910 and a mouse, keyboard, or printer coupled to human interface 914. Other devices may be coupled to CPU 902, and additional or fewer interface cards may be utilized. For example, a serial interface such as Universal Serial Bus (USB) (not shown) may be used to provide an interface for an external device.

Computing system 900 also includes one or more network interfaces 912, which may comprise wired links, such as an Ethernet cable, or wireless links to access nodes or different networks. Network interfaces 912 allow computing system 900 to communicate with remote units via the networks. For example, network interfaces 912 may provide wireless communication via one or more transmitters/transmit antennas and one or more receivers/receive antennas. In an embodiment, computing system 900 is coupled to a local-area network or a wide-area network for data processing and communications with remote devices, such as other processing units, the Internet, or remote storage facilities.

AU 904 includes one or more units implementing any of a variety of arithmetic operations, such as multiply, divide, add, subtract, square-root, and so on. Some of the units utilize multi-stage digit recoding to eliminate delay intensive carry propagate adders, which enables the use of higher radix operations without incurring extended delays that ordinarily slow the operations. AU 904 may include units such as GST divider 800, prescale state 900, reciprocal unit 1000, Goldschmidt divider 1100, and so on.

It should be appreciated that one or more steps of the embodiment methods provided herein may be performed by corresponding units or modules. A signal may be processed by a processing unit or a processing module. Other steps may be performed by a prescaling unit or module, a generating unit or module, a scaling unit or module, a recoding unit or module, a compressing unit or module, a predicting unit or module, a determining unit or module, an estimating unit or module, or a selecting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A redundant binary signed digit (RBSD) divider, comprising:

a first operand prescaling unit configured to:

scale a divisor by a first scaling factor;

a scaled divisor selection unit operatively coupled to the first operand prescaling unit, the scaled divisor selection unit configured to:

receive an output of the first operand prescaling unit, and selectively swap multiples of plus and minus vectors of inputs to the scaled divisor selection unit to produce selected multiples of a scaled divisor in accordance with a predicted sign of a partial remainder;

a digit recoder operatively coupled to a plurality of multiplexers, the digit recoder configured to:

recode at least one N-bit portion of the partial remainder as a combination of two N/2-bit vectors; and a plurality of full adder stages having inputs operatively coupled to the scaled divisor selection unit and outputs operatively coupled to the plurality of multiplexers, the plurality of full adder stages configured to:

compress a difference of the partial remainder and the selected multiples of the scaled divisor, the outputs of the plurality of full adder stages being in a redundant format.

2. The RBSD divider of claim 1, the first operand prescaling unit being further configured to:

generate one or more additional integer multiples of the scaled divisor.

3. The RBSD divider of claim 1, further comprising: a second operand prescaling unit configured to:

scale a dividend by the first scaling factor, and generate a first multiple of the scaled dividend.

4. The RBSD divider of claim 3, the scaled dividend being in one of a non-redundant normal binary format or an RBSD format.

5. The RBSD divider of claim 1, N being an even integer value.

6. The RBSD divider of claim 1, N being a combination of a first vector expressible as a ceiling (N/2) and a second vector expressible as a floor (N/2), when N is an odd integer value, where ceiling (N/2) produces a smallest integer greater than N/2 and floor (N/2) produces a largest integer smaller than N/2.

7. The RBSD divider of claim 1, each full adder stage of the plurality of full adder stages further comprising a partial adder stage.

8. The RBSD divider of claim 1, further comprising a sign predictor operatively coupled to the plurality of full adder stages, the sign predictor configured to:

generate the predicted sign of a subsequent partial remainder in accordance with the outputs of the plurality of full adder stages.

9. The RBSD divider of claim 1, the digit recoder comprising a plurality of first recoders coupled to high inputs of a third plurality of recoders and a fourth plurality of recoders, the plurality of first recoders configured to:

determine a combination of two N/2-bit first vectors or a combination of a ceiling(N/2)-bit first vector and a floor(N/2)-bit first vector in accordance with a plus output;

a plurality of second recoders coupled to low inputs of the third plurality of recoders and the fourth plurality of recoders, the plurality of second recoders configured to:

determine a combination of two N/2-bit second vectors or a combination of a ceiling(N/2)-bit second vector and a floor(N/2)-bit second vector in accordance with a minus output;

a plurality of third recoders coupled to the scaled divisor selection unit, the plurality of third recoders configured to:

select from one of a high plus output of the plurality of first recoders or a high minus output of the plurality of second recoders in accordance with the plus output and the minus output; and a plurality of fourth recoders coupled to the scaled divisor selection unit, the plurality of fourth recoders configured to:

select from one of a low plus output of the plurality of first recoders or a low minus output of the plurality of second recoders in accordance with the plus output and the minus output.

10. The RBSD divider of claim 1, further comprising a reciprocal unit operatively coupled to the first operand prescaling unit, the reciprocal unit configured to:

estimate a reciprocal of the divisor.

11. The RBSD divider of claim 1, wherein N is equal to 6, N/2 is equal to 3, and wherein a first integer multiple of the scaled divisor is 1, and additional integer multiples of the scaled divisor are 3, 5, 6, and 7.

12. The RBSD divider of claim 1, wherein N is equal to 5, ceiling(N/2) is equal to 3, and floor(N/2) is equal to 2, and wherein a first integer multiple of the scaled divisor is 1, and additional integer multiples of the scaled divisor are 3, 5, 6, and 7.

13. The RBSD divider of claim 1, wherein N is equal to 4, N/2 is equal to 2, and wherein a first integer multiple of the scaled divisor is 1, and an additional integer multiple of the scaled divisor is 3.

14. The RBSD divider of claim 1, wherein N is equal to 3, ceiling(N/2) is equal to 2, and floor(N/2) is equal to 1, and wherein a first integer multiple of the scaled divisor is 1, and an additional integer multiple of the scaled divisor is 3.

15. The RBSD divider of claim 1, wherein N is equal to 2, N/2 is equal to 1, and wherein a first integer multiple of the scaled divisor is 1.

16. A method implemented by a redundant binary signed digit (RBSD) divider, the method comprising:

prescaling, by the RBSD divider, a divisor and a dividend, the divisor and the dividend being inputs to the RBSD divider; and iteratively generating, by the RBSD divider, a quotient and a remainder in accordance with the divisor and the dividend utilizing a recoding of one or more radix $2^N$ multiples of most significant bits of a partial remainder.

17. The method of claim 16, the one or more radix $2^N$ multiples of the most significant bits of the partial remainder being recoded into two or more radix $2^N/2$ multiples when N is even.

18. The method of claim 16, the one or more radix $2^N$ multiples of the most significant bits of the partial remainder being recoded into two or more radix $2^{ceiling(N/2)}$ and radix $2^{floor(N/2)}$ multiples when N is odd.

19. The method of claim 16, prescaling the divisor and the dividend comprising:

scaling, by the RBSD divider, the divisor by a first scaling factor and one or more additional integer multiples of the first scaling factor; and scaling, by the RBSD divider, the dividend by the first scaling factor.

20. The method of claim 19, iteratively generating the quotient and the remainder comprising:

recoding, by the RBSD divider, an N-bit portion of the partial remainder as a combination of two N/2-bit vectors or a combination of a ceiling(N/2) bit vector and a floor(N/2) bit vector, where 2N is a radix of the N-bit portion of the partial remainder being recoded;

selecting, by the RBSD divider, a plurality of first scaled divisors or second scaled divisors in accordance with a sign of outputs of the recoding; and compressing, by the RBSD divider, the plurality of first scaled divisors or second scaled divisors, and a current partial remainder, an output of the compressing comprising a difference of the current partial remainder and a sum of the plurality of first scaled divisors or the one or more additional integer multiples of the scaled divisor.

21. The method of claim 20, further comprising:

predicting, by the RBSD divider, a sign of a subsequent partial remainder in accordance with the output of the compressing.

22. The method of claim 20, recoding one or more N-bit portions of the partial remainder comprising:

determining the combination of the two N/2-bit vectors or a combination of a ceiling(N/2)-bit first vector and a floor(N/2)-bit first vector in accordance with a plus output of the partial remainder;

determining the combination of the two N/2-bit vectors or a combination of a ceiling(N/2)-bit second vector and a floor(N/2)-bit second vector in accordance with a minus output of the partial remainder;

selecting one of a high plus output of the combination of two N/2-bit first vectors or the combination of the ceiling(N/2)-bit first vector and the floor(N/2)-bit first vector, or a high minus output of the combination of two N/2-bit second vectors or the combination of the ceiling(N/2)-bit second vector and the floor(N/2)-bit second vector in accordance with the plus output and the minus output; and selecting one of a low plus output of the combination of two N/2-bit first vectors or the ceiling(N/2)-bit first vector and the floor(N/2)-bit first vector, or a low minus output of the combination of two N/2-bit second vectors or the ceiling(N/2)-bit second vector and the floor (N/2)-bit second vector in accordance with the plus output and the minus output.

23. The method of claim 16, further comprising estimating, by the RBSD divider, a reciprocal of the divisor.

24. The method of claim 16, wherein N is equal to 6 or 5, and wherein a first multiple of a scaled divisor is 1, and additional integer multiples of the scaled divisor are 3, 5, 6, and 7.

25. The method of claim 16, wherein N is equal to 4 or 3, and wherein a first multiple of a scaled divisor is 1, and an additional integer multiple of the scaled divisor is 3.

26. The method of claim 16, wherein N is equal to 2, and wherein a first multiple of a scaled divisor is 1, and there are no other additional integer multiples of the scaled divisor.

27. A system comprising:

a non-transitory memory storage comprising instructions and data;

one or more processors in communication with the non-transitory memory storage, wherein the one or more processors execute the instructions; and an arithmetic unit in communication with the one or more processors and the non-transitory memory storage, the arithmetic unit comprising:

a first operand prescaling unit configured to:

scale a divisor by a first scaling factor;

a scaled divisor selection unit operatively coupled to the first operand prescaling unit, the scaled divisor selection unit configured to:

receive an output of the first operand prescaling unit, and selectively swap multiples of plus and minus vectors of inputs to the scaled divisor selection unit to produce selected multiples of a scaled divisor in accordance with a predicted sign of a partial remainder;

a digit recoder operatively coupled to a plurality of multiplexers, the digit recoder configured to:

recode at least one N-bit portion of the partial remainder as a combination of two N/2-bit vectors; and a plurality of full adder stages having inputs operatively coupled to the scaled divisor selection unit and outputs operatively coupled to the plurality of multiplexers, the plurality of full adder stages configured to:

compress a difference of the partial remainder and the selected multiples of the scaled divisor, the outputs of the plurality of full adder stages being in a redundant format.

28. The system of claim 27, the first operand prescaling unit being further configured to:

generate one or more additional integer multiples of the scaled divisor.

29. The system of claim 27, the arithmetic unit further comprising a second operand scaling unit configured to:

scale a dividend by the first scaling factor, and generate a first multiple of the scaled dividend.

30. The system of claim 27, the arithmetic unit further comprising a sign predictor operatively coupled to the plurality of full adder stages, the sign predictor configured to generate the predicted sign of a subsequent partial remainder in accordance with the outputs of the plurality of full adder stages.

31. The system of claim 27, the digit recoder comprising:

a plurality of first recoders coupled to high inputs of a third plurality of recoders and a fourth plurality of recoders, the plurality of first recoders configured to:

determine a combination of two N/2-bit first vectors or a combination of a ceiling(N/2)-bit first vector and a floor(N/2)-bit first vector in accordance with a plus output;

a plurality of second recoders coupled to low inputs of the third plurality of recoders and the fourth plurality of recoders, the plurality of second recoders configured to:

determine a combination of two N/2-bit second vectors or a combination of a ceiling(N/2)-bit second vector and a floor(N/2)-bit second vector in accordance with a minus output;

a plurality of third recoders coupled to the scaled divisor selection unit, the plurality of third recoders configured to:

select from one of a high plus output of the plurality of first recoders or a high minus output of the plurality of second recoders in accordance with the plus output and the minus output; and a plurality of fourth recoders coupled to the scaled divisor selection unit, the plurality of fourth recoders configured to:

select from one of a low plus output of the plurality of first recoders or a low minus output of the plurality of second recoders in accordance with the plus output and the minus output.

32. The system of claim 27, the arithmetic unit further comprising a reciprocal unit operatively coupled to the first operand prescaling unit, the reciprocal unit configured to: estimate a reciprocal of the divisor.

* * * * *